United States Patent [19]

Hiles

[11] Patent Number: 4,766,688

[45] Date of Patent: Aug. 30, 1988

[54] STRIKE INDICATOR FOR FISHING TACKLE

[76] Inventor: Richard Hiles, 2870 Maysville Pike, Lot No. 54, Zanesville, Ohio 43701

[21] Appl. No.: 47,092

[22] Filed: May 8, 1987

[51] Int. Cl.[4] ............................................. A01K 97/12
[52] U.S. Cl. ......................................................... 43/17
[58] Field of Search ....................................... 43/17, 16

[56] References Cited

U.S. PATENT DOCUMENTS

| | | | |
|---|---|---|---|
| 2,302,337 | 11/1942 | Mantell | 43/16 |
| 2,910,797 | 11/1959 | Cucuro | 43/17 |
| 3,188,767 | 6/1965 | Finefield | 43/17 |
| 3,696,546 | 10/1972 | Ambrose | 43/17 |
| 3,820,268 | 6/1974 | Newton | 43/17 |
| 3,882,629 | 5/1975 | Kaye | 43/17 |
| 3,918,191 | 11/1975 | Williamson | 43/17 |
| 4,020,578 | 5/1977 | Hope | 43/17 |
| 4,399,630 | 8/1983 | Lawes | 43/17 |
| 4,479,321 | 10/1984 | Wilstead | 43/17 |
| 4,486,969 | 12/1984 | Swenson | 43/17 |
| 4,505,063 | 3/1985 | Price et al. | 43/17 |
| 4,586,284 | 5/1986 | Westwood | 43/17 |

Primary Examiner—Gene P. Crosby
Attorney, Agent, or Firm—Biebel, French & Nauman

[57] ABSTRACT

A strike indicator for simple and direct mounting to a flexible fishing pole which is held in a mount at a predetermined angle after casting. The indicator has an elongated hollow elongated casing and a circuit board is supported lengthwise in the casing. A mercury switch is fixed at a predetermined angle on the board, which also has battery contacts receiving disc type batteries as self-contained power. A buzzer and/or lamp is supported by the casing at its exterior and connected to the battery contacts through the mercury switch. An access cap on an end of the casing provides for installation/removal of batteries. At the bottom of the casing spaced apart grommet caddies, aligned along an axis parallel to the bottom, hold annular compressible grommets for engaging around a fishing pole to support the casing on the pole. The grommet caddies include openable sections for installation and substitution of different sized grommets. The casing is an integral molded water-tight part and the cap, switch and indicator structure are provided with gaskets where they protrude through the casing, thus the circuit board and battery compartment are sealed within the casing.

14 Claims, 3 Drawing Sheets

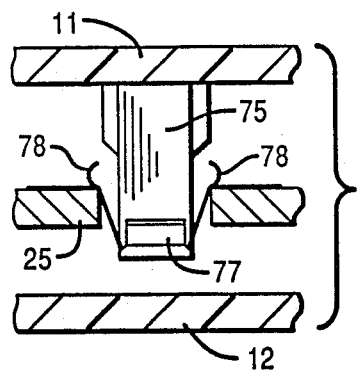
FIG. 11
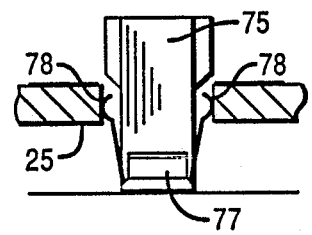
FIG. 12
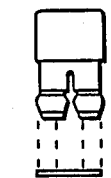
FIG. 10
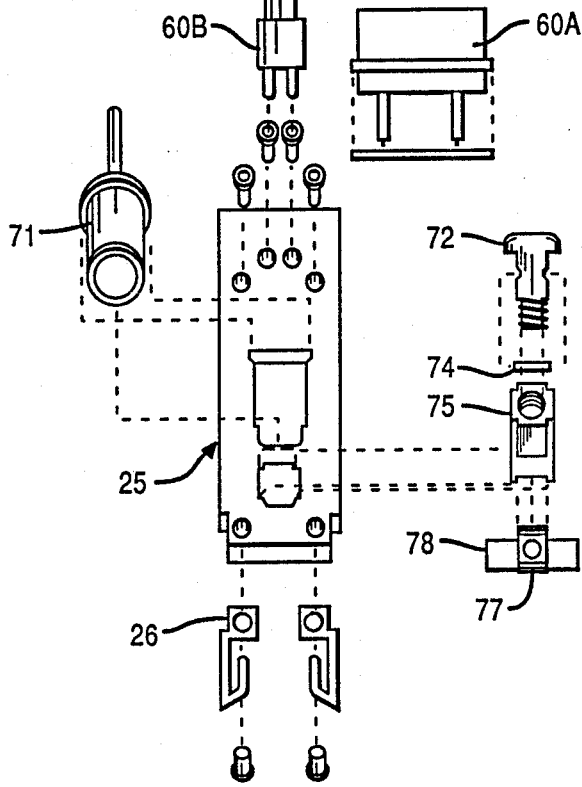
FIG. 9
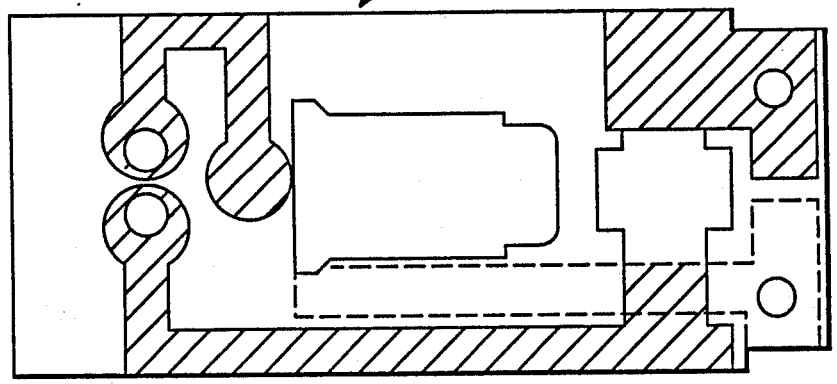

STRIKE INDICATOR FOR FISHING TACKLE

BACKGROUND OF THE INVENTION

This invention relates to a device for attachment to fishing tackle, specifically to a fishing rod or pole, and in the majority of cases to lighter weight tackle, to indicate there is fish hooked on the line extending from the pole.

Various devices have been disclosed using audible and/or visible indicators for this purpose. Very few such devices have been commercially successful, and it is believed that a significant reason for lack of success has been excessive complexity and the need to make changes and/or additions to the fishing tackle, and an inability to set the indicator with enough precision that it will function when there is a strike (fish on the hook) but not just a nibble or slight disturbance.

In general, prior art devices are characterized by some sort of level responsive switch, typically a mercury switch, mounted to a fishing pole, and connected in series with a power source and an indicator, e.g. a buzzer or light or both. When fishing on bottom, from land, boat, dock, etc. a fisherman may use several poles, cast each some distance apart, and support the poles in available holders or leaned against a leaning aid (such as a forked tree limb etc.) at an approximate 45 degree angle. This allows the fisherman to work several lines at essentially one time.

U.S. Pat. No. 3,882,629 shows such a general arrangement, with small battery operated light attached through a mercury switch to a penlight battery and mounted in a cylindrical housing which is fixed by a bracket to the tip of a fishing pole. The bracket includes a means for adjusting the angle of the housing and thus the angle at which the mercury switch will close when the pole bends. The pole is supported in a typical holder.

U.S. Pat. No. 4,479,321 discloses a similar arramgement with a direct mounting of the cylindrical housing along a pole, and an adjustment which contemplates rotating the housing to change the response angle of the mercury switch. The pole is supported in a forked arm.

U.S. Pat. No. 4,399,630 shows a mercury switch controlled light at a pole tip, using a remote electrical source such as a trolling motor battery, or a battery pack in the handle of the pole.

U.S. Pat. No. 2,910,797 discloses a mounting tripod for a pole, including a lamp on a counterweighted arm, which is in turn attached to and supports the pole.

U.S. Pat. No. 3,820,268 to Newton discloses a esparate light and buzzer spaced apart on a rod, and activated by two metal brackets mounted near the rod tip and acting as electrical contacts. Sensitivity of the device is set by a thumbscrew mounted between these brackets.

U.S. Pat. No. 3,696,546 to Ambrose discloses a housing located near the rod handle and having a telescopic contact (resembling a portable radio antenna) extending from the housing upward on the rod. This contact is exposed next to a clamp which is connected in and electrical series circuit. The device actuates when the rod bends and pulls the clamp against the telescopic contact.

U.S. Pat. No. 2,302,337 shows a device having a flashlight configuration, mounted on a rod by metal clamps and machine screws. There is a light at the lower end of the device, and a push-type switch protruding from the upper end of the device. A helical spring is positioned to press against this switch when the rod is bent. Sensitivity is adjusted by altering the position of the mounting brackets.

U.S. Pat. No. 4,505,063 discloses a device using liquid reactants which when combined form a chemiluminescent liquid. The device is supported near the tip of a pole, and the reactants combine when the pole is moved beyond a certain limit.

All of the aforementioned devices are difficult to set, difficult to attach to the pole, and/or have limted usage. Devices mounted near the tip of a pole exhibit high sensitivity, and tend to give spurious signals; in many instances the lighted indicator have small lamps or bulbs, with low power, aimed away from the expected position of the monitoring fisherman. The chemiluminescent device is capable of only a single use.

These devices, as a whole, appear to have various mechanical eccentricities which make them unpractical, if not very difficult, to use repeatedly, to be essentially maintenance free, to be waterproof, to adapt to use with a variety of fishing tackle, and to be set/adjusted to provide the indication (or alarm) at an appropriate time when there is a strike on the particular pole to which the device is connected.

SUMMARY OF THE INVENTION

As mentioned, when fishing on bottom, from land, boat, dock, etc. fishing rods are often placed into an adjustable holder or leaned against an aid (such as a forked tree limb etc.) at an approximate 45 degree angle allowing the fisherman to work several lines at essentially one time. To compensate for the 45 degree rod angle, the present invention incorporates a mercury switch mounted onto a circuit board within a strike indicator device at an approximate 45 degree angle in the opposite direction from which the rod is tilted. This automatically puts the mercury switch at or near its make/break point when the device is mounted to a pole and placed into or against a holder at an approximate 45 degree angle. Therefore, to fine tune the sensitivity (after casting and placing into or against a holder at an approximate 45 degree angle) the fisherman simply makes a minor adjustment to the angle of the pole.

Thus, the invention provides a strike indicator for simple and direct mounting to a flexible fishing pole which is held in a mount at a predetermined angle after casting. The indicator has an elongated hollow casing with a top, a bottom, opposite ends and opposite sides, and a circuit board is supported lengthwise in the casing. A mercury switch is fixed at a predetermined angle on the board, which also has battery contacts in the casing for receiving one or more disc type batteries as a self-contained electric power source. An audible and/or visible indicator means, i.e. a buzzer and/or lamp, is supported by the casing at its exterior, and electrically connected to the battery contacts through the mercury switch. A removable access cap is fitted to the end of the casing opposite the circuit board, providing for installation and removal of one or more batteries.

At the bottom of the casing, a pair of spaced apart grommet caddies, adjacent and parallel to the casing ends, include openings aligned along an axis parallel to the bottom, and hold a pair of annular compressible grommets or glands, one in each caddy, for engaging around the top of a fishing pole to support the casing on the pole. The grommet caddies include openable sections which facilitate installation, replacement and substitution of different sized grommets.

A power control switch, having a manual control member extending through the top of the casing, is incorporated in the circuit board and electrically connected in series with the battery contacts, the mercury switch, and the lamp and/or buzzer.

The casing is an integral molded water-tight part and the cap, switch and indicator means are provided with water-tight gaskets where they protrude through said casing, thus the circuit board and battery compartment are sealed within the casing.

This approach to sensitivity adjustment eliminates the actual altering or positioning of the mercury switch itself, is performed very quickly and easily, and is extremely effective. Another added benefit is that when the rod is picked up following a strike and turned right side up (reel and line guides facing upward) into the reeling position, the mercury switch is then upside down (approximately 180 degrees from completing its circuit). Therefore, it is not necessary to press the on/-off switch to turn the device off upon retrieving the pole following a strike, unless preferred. The on/off switch is mainly for use when hand-holding the pole or for storage of the device.

To use the strike indicator device, the proper size of grommets is chosen for the diameter of the pole, and they are mounted into the respective caddies. The remaining grommets are saved for use with other poles of different diameters. After mounting the casing onto the pole, the rod holder is adjusted at an approximate 45 degree angle, or the support is likewise adjusted. Then with the on/off switch pressed, the line is cast as normal, any slack in the line is reeled in, and the pole is placed into its holder, reel facing down. Lifting the on/off switch applies power, and the angle of the rod is slightly adjusted until the light and/or buzzer is not activated.

The region of mounting for the device on the pole is about halfway to two-thirds up the rod from the handle. This location minimizes the possibility of whiplash as well as maintaining effective operation. The actual location of mounting may vary slightly according to the type of rod holder that is used. Either type of holder can be used (adjustable or leaning) although the adjustable holder, which securely holds the rod by the handle, permits a lower mounting of the strike indicator since it allows the rod to bounce more freely (during a strike) than the leaning type holder, which leans against the rod higher up from the handle and therefore slightly damps such bouncing action. Therefore, when using an adjustable holder, the device can be mounted at the approximate halfway point of the rod. Even with the leaning type holder, a mounting position closer then approximately eighteen inches from the rod tip is not necessary because of the extreme accuracy of sensitivity that this device provides.

The primary object of this invention, therefore, is to provide a novel strike indicator for fishing pole, having one or more of the features enumerated above, in which the mercury switch is positively mounted at a predetermined angle, sealed within the device; in which the device includes a small, lightweight hollow watertight casing enclosing the circuitry and power source, and in which the casing has spaced apart compressible grommets which can be engaged about and clamped to a section of the pole for simple and secure attachment at any desirable location along the length of the pole on the opposite side from the line guides and away from the tip of the pole where oversensitivity is possible.

Other objects and advantages of the invention will be apparent from the following description, the accompanying drawings and the appended claims.

BRIEF DESCRIPTION OF THE DRAWINGS

FIG. 9 is a plan view of the circuit board;

FIG. 10 is an exploded and somewhat diagrammatic drawing of the over-all organisation of the strike indicator; and FIGS. 11 and 12 are enlarged partial sectional views showing details of the power control switch in both "on" and "off" positions.

DESCRIPTION OF THE PREFERRED EMBODIMENTS

Figure 1:
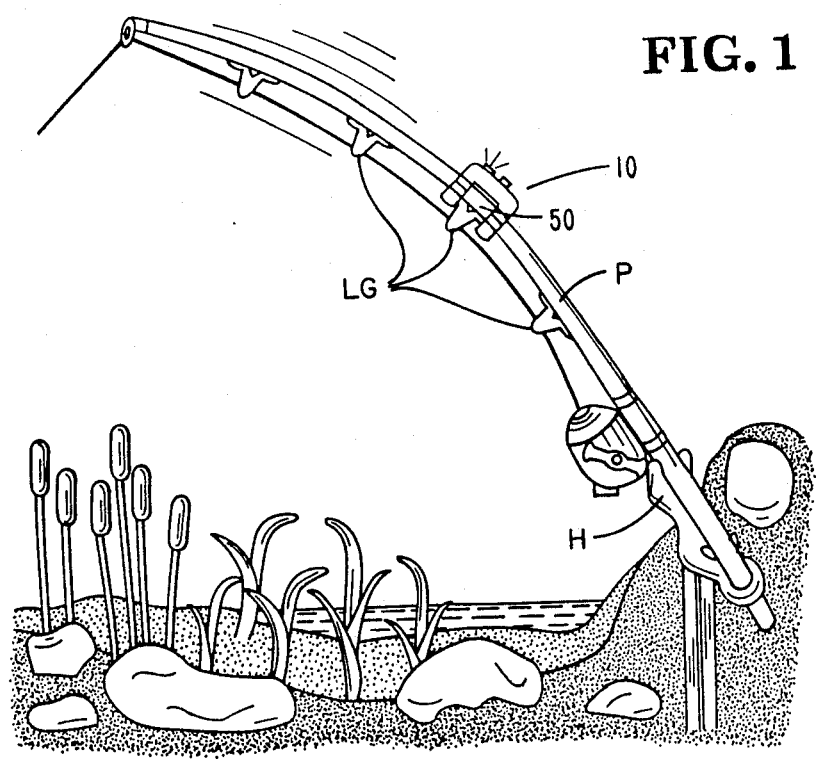
FIG. 1 is a drawing of a strike indicator as provided by the invention, fitted to a fishing rod or pole which is in turn held in an adjustable ground-supported holder or bracket.
Figure 6:
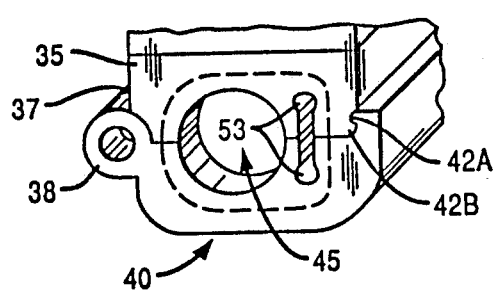
FIG. 6 is a partial perspective view of one of the grommet caddies in closed position.

Referring to FIGS. 1, 2, 3 and 4, a strike indicating device according to the invention includes a hollow casing 10, preferably formed from a molded plastic material, and having a top 11, a bottom 12, opposite ends 14 and 15, and opposite side 16, 17. The interior of casing 10 has a pair of opposed slots 20, 21 (FIG. 3) in the interior sides, which are dimensioned to receive a circuit board 25 and hold such board in a precise alignment with the longitudinal axis of the casing. The board is shorter than the interior length of the casing, and has a pair of battery terminal strips 26 (FIGS. 2, 4 and 5), preferably of spring-like metal, which are located between the end of board 25 and the removable cap member 28 which is fitted to the end 15 and provoded with a seal ring or gasket 29.

At the bottom 12, adjacent opposite ends of the casing, there are grommet caddies 30 and 31, each of which includes an upper section 35 molded as part of the casing and having a hinge ear 37 which cooperates with an appropriately spaced set of hinge ears 38 on a hinged lower section or carrier 40. The carriers and the upper sections have interlocking or latching lips 42A, 42B which normally hold the carriers closed against the upper sections, defining generally circular openings 45 therebetween and they are hinged by means of elongated eyelets or pins 47.

Figure 7:
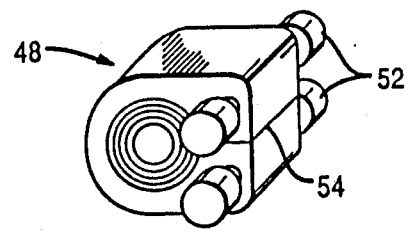
FIG. 7 is a perspective view of one of the grommets used to mount the strike indicator to a pole.
Figure 8:
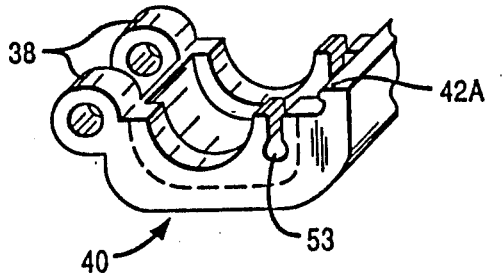
FIG. 8 is a perspective view of the lower section or carrier of the grommet caddy, to show how a grommet is fitted therein.
Figure 2:
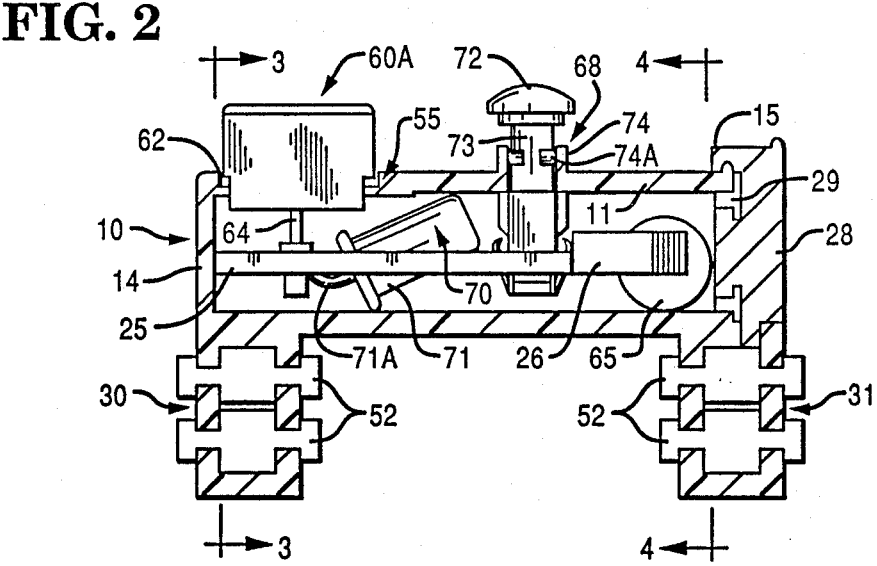
FIG. 2 is a longitudinal cross-section view of a strike indicator, with some parts shown in elevation.
Figures 3, 4:
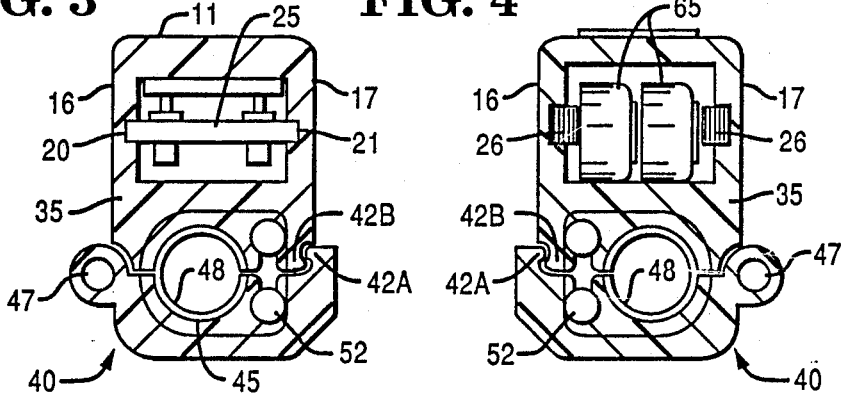
FIG. 3 is a cross-sectional view taken along line 3—3 of FIG. 2 with the buzzer structure deleted.
FIG. 4 is a cross-sectional view taken along line 4—4 in FIG. 2.

The carriers and the upper sections are dimensioned to hold between them a flexible grommet or gland 48, having an outer shape complementary to the carriers, and intended to engage about and press against the exterior of a segment of the pole, indicated at 50. In a typical embodiment of the invention the devices are provided with five pair of grommets which are identical except that each pair has a different size internal diameter (see FIG. 7) for fitting to different sizes of poles or rods. The different sizes of internal diameters may be, for example, ⅛, 5/32, 3/16, 7/32 and ¼ inches. These grommets are made of a very soft silicone rubber which allows for a secure and positive grip on all fishing poles.

A grommet is placed into each caddy (once opened) and is secured into the caddy by inserting rounded fastener pins 52 (located on the sides of the grommets) into retainer holes 53 in the caddies. The headed pins 52 may be separate from and inserted into the grommets, or may be integrally molded with the body of each grommet. Preferably each grommet is molded with a radial slit 54 (from its inner diameter to its outer diameter) which is located between the upper and lower fastener pins. This allows for the caddies to be opened and the grommets slipped around the rod. The caddies are closed around the rod and snapped shut by means of the latching lips.

Figure 5:
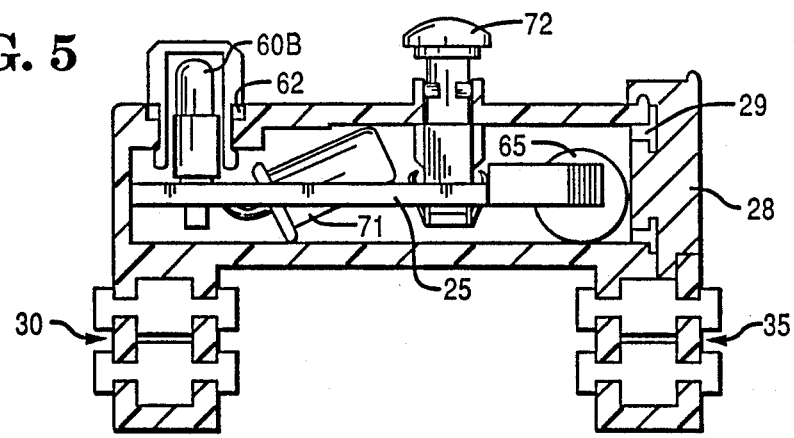
FIG. 5 is a view similar to FIG. 2 showing a visible indicating device.

The top 11 of casing 10 has a circular countersunk opening 55 through and in which is seated an audible warning device 60A (FIG. 2) or a visible warning device 60B (FIG. 5) e.g. a small high intensity lamp. Either of these is sealed to the casing by a gasket 62, and has electrical leads 64 which extend to appropriate sockets on the circuit board 25. It is contemplated that the device may be provided in two, or even three, versions; one would have only an audible indicator (FIGS. 2-4) and the other only a visible indicator (FIG. 5). However a device with both types of indicators is within the scope of the invention, and is represented schematically in FIG. 10.

The electrical circuit is relatively simple, however for the sake of rigidity and integrity it is preferred to utilize a double sided printed circuit board. The upper and lower circuit patterns are readily visible from FIG. 9, and they provide a series circuit connection from a power source, namely one or more disc-like batteries 65 (e.g. Eveready, type 393, high drain), the battery contacts or strips 26 on the end of board 25, and the sockets on the board to the warning device 60A or 60B, via a manually operated power control switch 68 and a motion responsive electrical switch 70, such as a mercury switch which is enclosed in a small metal housing or can 71.

Switch 68 includes a manual operating button 72 on the end of a stem 73 which extends through a small cylindrical guide 74 molded into the casing top 11 and having an O-ring seal 74A thereon. Stem 73 is fixed to a generally square body 75 which carries a spring metal contact member 77 having arms 78 which engage the adjacent metal ares on the board 25 to complete the circuit in the depressed "on" position of switch 68 (See and compare FIGS. 11 and 12). The user thus can turn the power on or off simply by raising or depressing the button 72.

A typical motion responsive switch 70 employs the metal body or can 71 as one of its terminals, and has a lead 71A as the other terminal. The switch body thus can be soldered directly to a pad on the circuit board, at the desired predetermined angle with respect to the plane of the board, and the lead 71A soldered to another connection on the board. The angular mounting of the switch body to the board, and thus to casing 10, will in turn predetermine the range of motion (and angular position) through which switch 70 will open and close.

As seen in FIG. 1, the strike indicating devices are intended to be mounted directly on a typical flexible fising pole P, on the back side with respect to the line guides LG. The main advantage of this area of mounting is minimizing the possibility of the fishing line coming in contact with or interfering with the devices in any way. Also, this clearly exposes the devices directly on the top of the rod when the rod is placed into a holder H, as later described. This is a major advantage for the versions of the device which employ a visible indicator, e.g. a lamp, since this positions the lamp directly on top of the rod and allows the flashing light to be viewed from a 360° angle, particularly from behind or beside the fishing pole.

The casing 10 is waterproof because of the gaskets located on the end cap, the lamp or buzzer, and the power switch. Thus, if the casing should be dropped in water, there will be no damage to the circuitry and the strike indicator can be used again almost immediately.

While the forms of apparatus herein described constitute preferred embodiments of this invention, it is to be understood that the invention is not limited to these precise forms of apparatus, and that changes may be made therein without departing from the scope of the invention which is defined in the appended claims.

I claim:
1. A strike indicator for use on a flexible fishing pole which is held in a mount at a predetermined angle after casting, said indicator comprising
   an elongated hollow casing having a top, a bottom, opposite ends and opposite sides,
   circuit means supported in said casing including a motion responsive electrical switch supported at a predetermined angle with respect to said bottom of said casing at which angle said switch is open,
   battery contact means in said casing for receiving one or more batteries as an electric power source,
   an audible and/or visible indicator means supported by said casing and electrically connected to said battery contact means through said motion responsive switch,
   a pair of spaced apart grommet caddies on said casing adjacent said opposite ends thereof, and
   a pair of annular compressible grommets, one in each of said caddies, for engaging around a fishing pole at spaced apart locations to support said casing on the pole with said sides of said casing aligned with the length of said pole whereby flexing motion of the pole will result in actuation of said motion responsive switch.

2. A strike indicator as defined in claim 1,
   said circuit means including a printed circuit card mounted in said casing extending inward from one of said ends toward and spaced from the other said end,
   said battery contact means extending from said card in the direction of said other end,
   a removable access cap fitted to said other end of said casing providing for installation and removal of a battery to said battery contact means.

3. A strike indicator as defined in claim 2,
   said circuit card including contacts attached to said indicator means,
   said indicator means being mounted extending through said top of said casing and electrically connected to said circuit card.

4. A strike indicator as defined in claim 3, wherein said indicator means is a low power lamp.

5. A strike indicator as defined in claim 3, wherein said indicator means is a buzzer.

6. A strike indicator as defined in claim 2,
including a power control switch electrically connected in series with said battery contact means, said motion responsive switch, and said indicator means,
a manual control member for said power control switch and accessible from the exterior of said casing.

7. A strike indicator as defined in claim 6, wherein said power control switch is incorporated in said circuit card and said manual control member extends from said power control switch through said top of said casing.

8. A strike indicator as defined in claim 1, wherein said caddies extend from said bottom of said casing parallel to said ends thereof and include openings aligned along an axis parallel to said bottom of said casing whereby said casing can be supported along the top of a pole.

9. A strike indicator as defined in claim 8,
said grommet caddies including openable sections which facilitates installation and replacement of grommets therein and substitution of different sized grommets.

10. A strike indicator as defined in claim 2, wherein said casing is an integral molded water-tight part and said cap and indicator means are provided with water-tight gaskets where they protrude through said casing,
whereby said circuit card and said battery compartment are sealed within said casing.

11. A strike indicator for use on a flexible fishing pole which is held in a mount at a predetermined angle after casing, said indicator comprising
a water-tight elongated hollow casing having a top, a bottom, opposite ends and opposite sides,
circuit means supported in said casing including a motion responsive electrical switch and battery contact means for receiving one or more batteries as an electric power source,
an audible and/or visible indicator means supported by said casing and electrically connected to said battery contact means through said motion responsive switch,
a pair of spaced apart grommet caddies on said casing adjacent said opposite ends thereof and having openings aligned along an axis parallel to said elongated bottom of said casing, and
a pair of annular compressible grommets, one in each of said caddies, for engaging around a fishing pole to support said casing on the pole and parallel to the length thereof whereby flexing of said pole will actuate said motion responsive switch.

12. A strike indicator as defined in claim 11,
said grommet caddies including openable sections which facilitate installation and replacement of grommets therein and substitution of different sized grommets.

13. A strike indicator as defined in claim 11, wherein said batteries are disc type devices supported between said battery contact means.

14. A strike indicator for use on a flexible fishing pole which is held in a mount at a predetermined angle after casting, said indicator comprising
a water-tight elongated hollow casing having a top, a bottom, opposite ends and opposite sides,
a circuit card supported in said casing parallel to said bottom,
said circuit card including a motion responsive electrical switch fixed thereto at a predetermined angle and battery contact means for receiving one or more batteries as an electric power source,
an audible and/or visible indicator means supported by said casing and electrically connected to said circuit for energization through said motion responsive switch,
a pair of spaced apart grommet caddies extending from said bottom of said casing adjacent and transverse to said opposite ends thereof, said caddies having openings which are located along a line parallel to said bottom, and
a pair of annular compressible grommets, one in each of said caddies, for engaging around a fishing pole to support said casing on the pole
whereby mounting of said casing on a rod automatically defines the angle of said motion repsonsive switch with respect to the length of the rod.

* * * * *